(12) United States Patent
Oliveira et al.

(10) Patent No.: US 8,182,758 B2
(45) Date of Patent: May 22, 2012

(54) APPARATUS AND METHOD FOR LOADING PARTICULATE MATERIAL INTO VERTICAL TUBES

(75) Inventors: Francisco de Assis Oliveira, Petropolis (BR); Ricardo Lopes Matriciano, Rio de Janeiro (BR)

(73) Assignee: Petroleo Brasileiro S.A.-Petrobras, Rio de Janeiro (BR)

( * ) Notice: Subject to any disclaimer, the term of this patent is extended or adjusted under 35 U.S.C. 154(b) by 411 days.

(21) Appl. No.: 12/423,264

(22) Filed: Apr. 14, 2009

(65) Prior Publication Data

US 2009/0257849 A1    Oct. 15, 2009

(30) Foreign Application Priority Data

Apr. 15, 2008  (BR) ...................................... 0801123

(51) Int. Cl.
| | |
|---|---|
| *B01J 8/08* | (2006.01) |
| *B01J 19/00* | (2006.01) |
| *B01J 8/02* | (2006.01) |
| *B01J 35/02* | (2006.01) |
| *B01D 50/00* | (2006.01) |
| *B01D 53/34* | (2006.01) |
| *B66C 17/08* | (2006.01) |

(52) U.S. Cl. ........ 422/232; 422/129; 422/168; 422/177; 422/211; 422/233; 414/160; 141/1

(58) Field of Classification Search .................. 422/129, 422/168, 177, 211, 232, 233; 414/160, 804; 141/1, 12, 250, 251, 257, 260; 48/61, 197 R
See application file for complete search history.

(56) References Cited

U.S. PATENT DOCUMENTS

| | | | | |
|---|---|---|---|---|
| 3,608,751 | A * | 9/1971 | Hundtofte | 414/287 |
| 3,878,590 | A * | 4/1975 | Bolger | 47/44 |
| 7,673,660 | B2 * | 3/2010 | McNaughton | 141/251 |
| 7,770,613 | B2 * | 8/2010 | Brennom | 141/250 |
| 2006/0213575 | A1 * | 9/2006 | McNaughton | 141/286 |

FOREIGN PATENT DOCUMENTS

| | | | |
|---|---|---|---|
| EP | 1594605 B1 | 6/2007 | |
| RU | 2250132 C2 * | 4/2005 | |
| WO | WO 2004/028679 A1 * | 4/2004 | |
| WO | WO 2004/096428 A1 * | 11/2004 | |

OTHER PUBLICATIONS

Machine translation of abstract of RU 2250132 C2, which was published Apr. 20, 2005.*

* cited by examiner

*Primary Examiner* — Walter D Griffin
*Assistant Examiner* — Natasha Young
(74) *Attorney, Agent, or Firm* — Sughrue Mion, PLLC

(57) ABSTRACT

An apparatus and method for loading particulate material in a vertical tube comprising at least one impact-absorbing module, a central axis and a sustaining wire to position the apparatus suspended in the interior of the tube in such a way as to allow loading and uniform distribution of all the material loaded in the tube and the method of loading that uses the apparatus is also described.

16 Claims, 7 Drawing Sheets

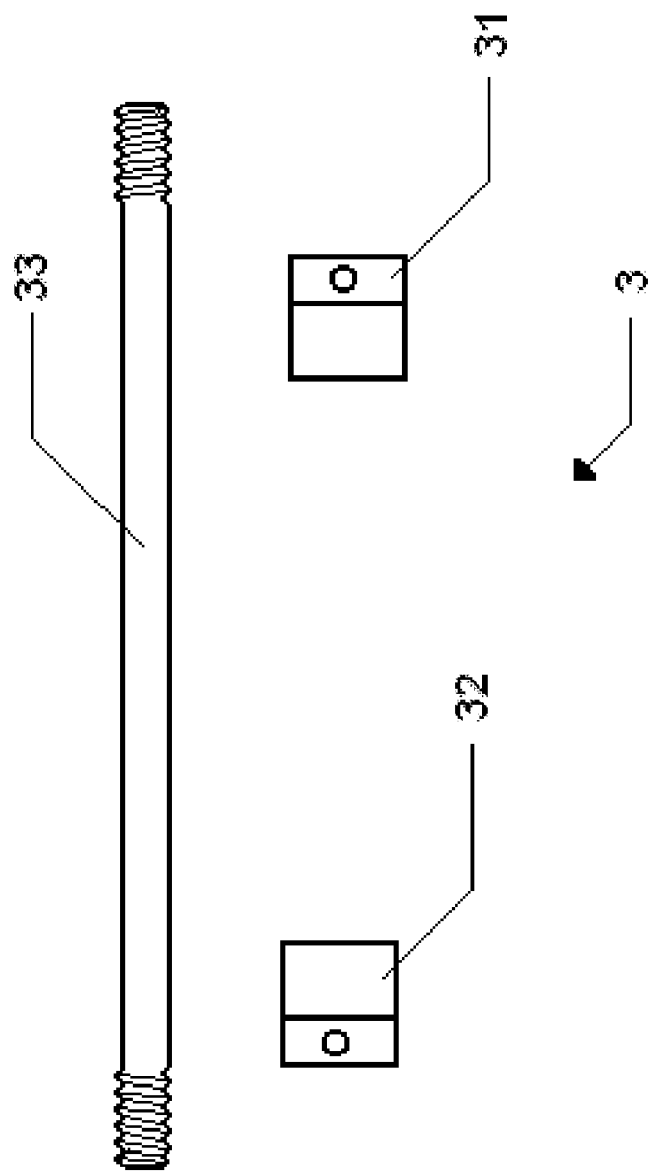

APPARATUS AND METHOD FOR LOADING PARTICULATE MATERIAL INTO VERTICAL TUBES

CROSS-REFERENCE TO RELATED PATENT APPLICATION

This application claims the benefit of Brazilian Patent Application No. PI 0801123-0, filed on Apr. 15, 2008, in the Brazilian Patent Office, the disclosure of which is incorporated herein in its entirety by reference.

BACKGROUND

1. Field

Embodiments of the present invention relate to apparatuses and methods for loading particulate materials into vertical tubes, more particularly apparatuses and methods for loading catalysts into columns of conversion furnaces of hydrogen generation units.

2. Description of Related Art

Oil refineries usually use a large volume of hydrogen in their processes. This hydrogen normally comes from hydrogen generation units, where conversion furnaces having dozens or, in some cases, hundreds of vertical columns filled with particles of catalyst are used to exchange heat. After a certain amount of operation time, the spent catalyst in the vertical tubes must be replaced. To replace the spent catalyst it is necessary to use methods and apparatuses to load particles of catalyst into the interior of the vertical tubes.

In these cases the loading must be carried out carefully to avoid problems caused by the presence of empty internal spaces and variations in density in the load of the catalyst. Other possible problems include breakage of or damage to the particles of catalyst during the loading. For example, when the particles are dropped from a great height, depending on the length of the vertical column, the impact with the walls, or even the bottom of the column, can cause the particles of catalyst to break or be damaged, harming the efficiency of the catalyst.

If there are broken particles, or there are too many empty spaces in the interior of the column loaded with solid particles, this results in variations in density of catalyst over the length of the column. As a consequence, the pressure of the operation in the column varies, which generates distortions in the distribution of the gas in the reactor of the conversion furnaces and causes unequal distributions of temperature over the length of the columns during the operation of the conversion furnace.

Usually, to reduce the empty spaces or to make the density of the catalyst uniform, a vertical column can be vibrated, over its length, or receive blows to its upper part during the loading of the particulate material. However, this operation normally delays the loading, and also submits the column to further tension, reducing its useful life or causing irreparable damage. If an excessive quantity of catalyst has been damaged during the loading, the only solution is usually to remove all the catalyst from the interior of the column and carry out a new loading, requiring duplication of the work and loss of catalyst.

In another loading method for particulate material used to reduce the variation of density of the material distributed in the vertical column of conversion furnaces, socks made of plastic material and filled with catalyst are used. When loading all the volume of material into the column, the sock is held by a thread and lowered to the bottom of each column. With a pull on the thread, the sock is opened and the catalyst is deposited in the interior of the column, traveling a small distance in free fall, which avoids breakage.

However, there are some disadvantages in using of this method. Sometimes the sock may open early, allowing the particles of catalyst to travel a larger distance in free fall, which can result in breakage or damage to the particles.

Further, if there are empty spaces between the particles in the interior of the sock, there will also be the same empty spaces within the vertical column at the completion of loading. Consequently, the vertical column must receive additional vibration or blows to make its density homogenous.

Another method of loading particulate material in vertical tubes is shown in patent number EP 1.594.605 B1. In this method, the particulate material is transported to the bottom of the tube by a damper made of a spiral rod. The rod in EP 1.594.605 B1 is continuous and extends for the whole of the length of the tube to be filled. As the particulate material is loaded, the rod is gradually lifted, being turned or vibrated during the loading from its upper limit. In this case, disadvantages are seen such as: causing damage to the tube due to the possible impact between the rod and the tube; the complexity of the operation, since the rod has to be lifted gradually; the need for a piece of equipment to make the rod turn or vibrate, which generates additional operation costs; and the difficulty of handling the rod, which has a length similar to that of the tube.

Exemplary embodiments of apparatuses and methods consistent with those described below may constitute an advantageous alternative for the loading of particulate material in a vertical tube, in relation to the methods discussed above.

SUMMARY

Embodiments of the present invention may provide an apparatus, and a method used by said apparatus, for loading particulate material in vertical tubes, more particularly for loading catalyst in a column of a conversion furnace in hydrogen generation units.

An exemplary apparatus of the present invention may have significant advantages in relation to those discussed above because it provides: smaller dimensions, low weight, ease and speed of handling, high resistance to chemical attack, high resistance to variations in temperature, low coefficients of friction, and low probability of retention of loaded material.

The exemplary apparatus comprises at least one damping (impact-absorbing) module, which is made up of an impact-absorber in the form of a double helix, with a cylindrical nucleus, with a groove along its longitudinal axis, and at least two blades having a propeller shape, disposed opposite to each other and at right angles to the cylindrical nucleus, each blade extending along the body of the nucleus completing half a phase of each helix. A metallic central axis is inserted on the longitudinal axis of the cylindrical nucleus, said central axis comprises a rod, a first connector and a second connector fixed to each end of the rod, and a suspension wire linked to the first connector of the central axis to position the impact-absorbing module suspended in the interior of the vertical tube. Further the suspension wire may link together a plurality of impact-absorbing modules, sequentially, so as to occupy the interior of the vertical tube.

The method used by the apparatus to load particulate material in vertical tubes comprises: positioning the apparatus in the interior of the vertical tube; loading a volume of particulate material into the interior of the vertical tube; suspending each impact-absorbing module at a height equivalent to the length of a module; removing each impact-absorbing module of the apparatus sequentially, as soon as each loading of a corresponding volume of particulate material is completed; and removing the whole apparatus when all the particulate volume has been completely loaded.

An exemplary method used by an exemplary embodiment of the apparatus of this invention may have advantages over current methods, because it provides: reduced time of loading; uniform loading density; and low cost. However, an exemplary embodiment of present invention need not have any advantages compared to other methods.

BRIEF DESCRIPTION OF THE DRAWINGS

The characteristics of the apparatus and method of loading of particulate material into the interior of vertical tubes of this invention will be better perceived from a detailed description of exemplary embodiments thereof in association with the drawings referred to below.

FIG. 3B separately shows an exemplary embodiment of the rod and the connectors and, which make up the central axis.

DETAILED DESCRIPTION OF EXEMPLARY EMBODIMENTS

This invention is an apparatus and a method for loading particulate material into vertical tubes, in particular for loading catalysts in columns of conversion furnaces of hydrogen generation units.

An exemplary embodiment of the invention will be described in accordance with the identification of the components it comprises. An exemplary embodiment may have significant advantages in relation to currently known apparatus of the technique since it provides:
  reduced dimensions;
  low weight;
  ease and speed of handling;
  immunity to chemical attacks;
  resistance to temperature variations;
  low attrition coefficient;
  low probability of retention of the material loaded.

Other advantages may be attributed to an exemplary method of loading using an exemplary embodiment of the apparatus, such as;
  shorter loading time;
  uniform loading density over the length of the tubes;
  low cost.

However, an embodiment of the present invention need not have any of the above discussed advantages.

Figure 1:
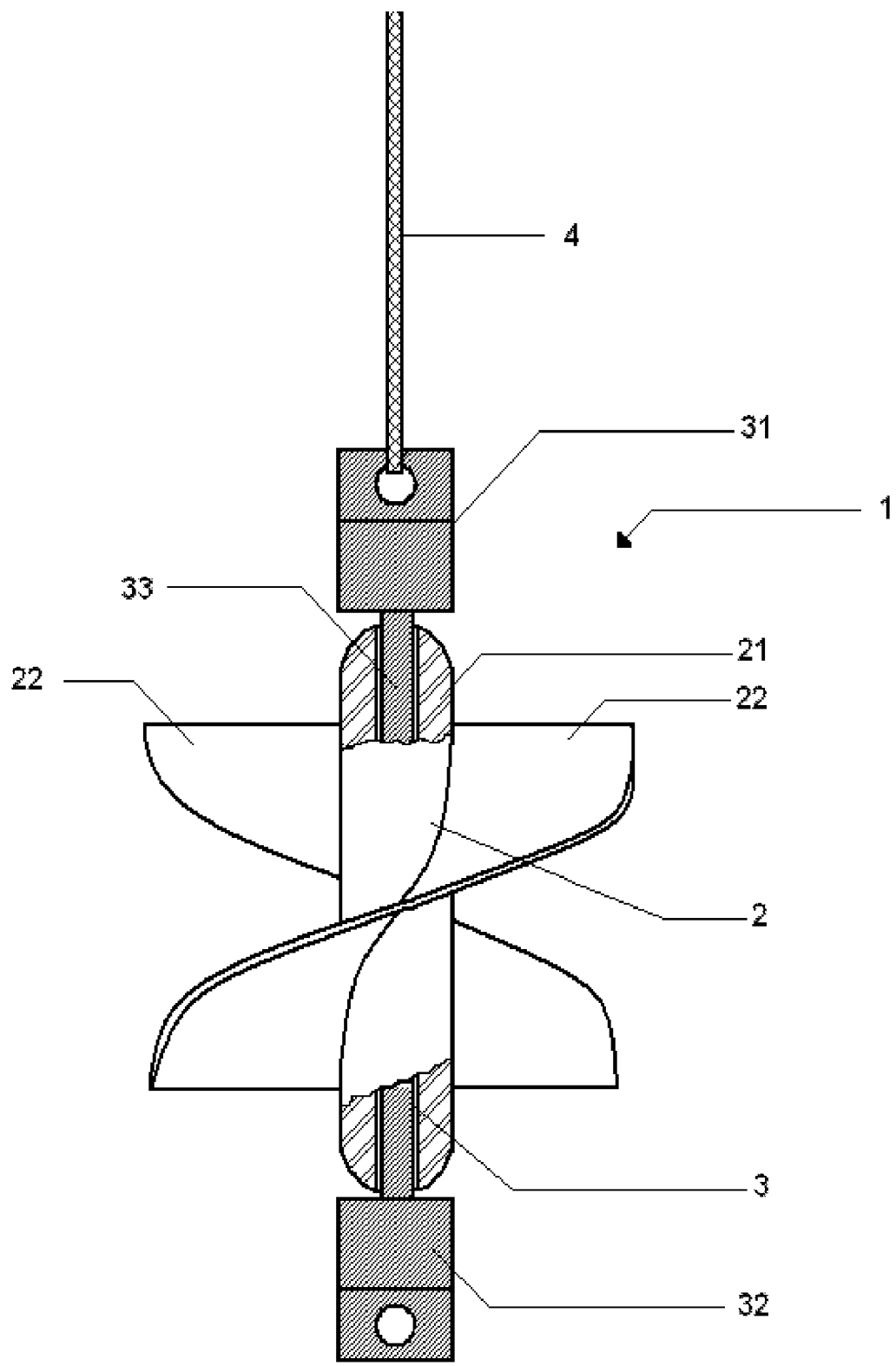
FIG. 1 presents a side view of the impact-absorbing module of an exemplary embodiment.

FIG. 1 shows a side view of an exemplary impact-absorbing module (1).

Figure 2:
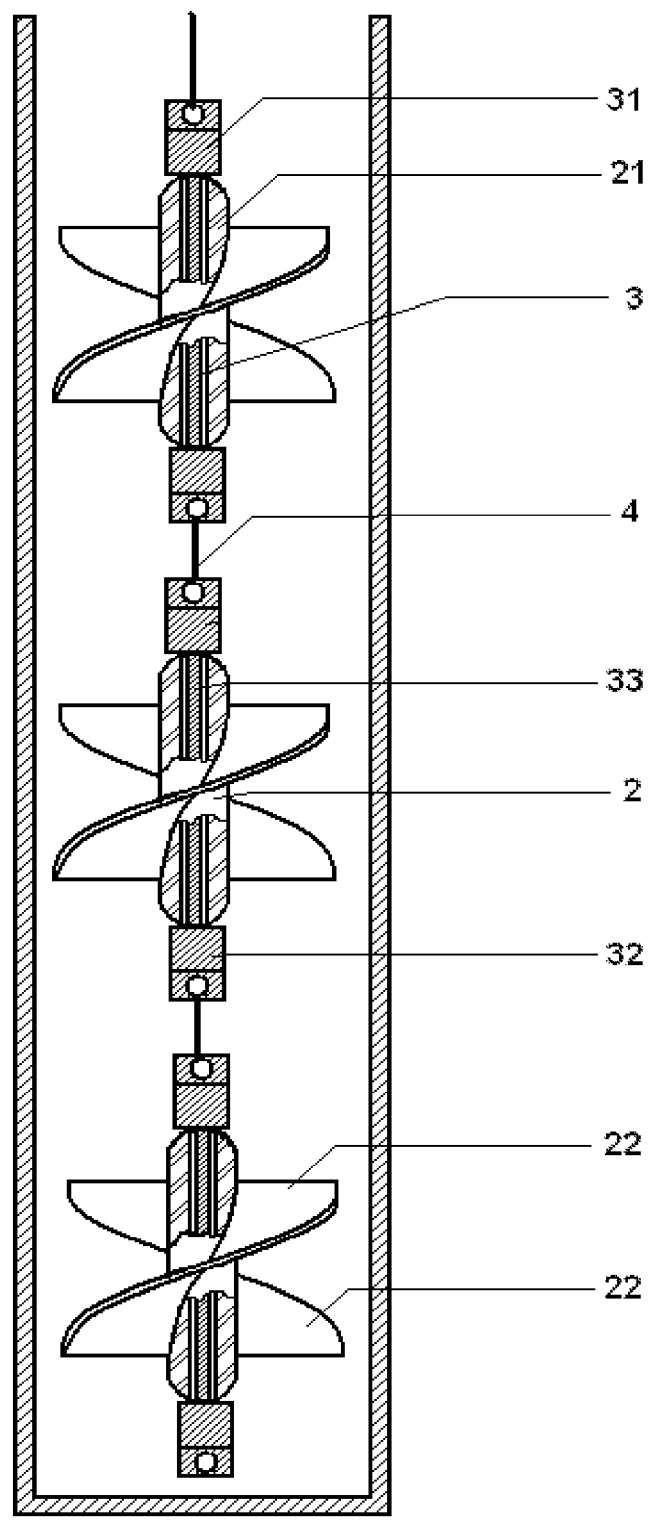
FIG. 2 shows an exemplary embodiment of the apparatus of this invention, comprising three impact-absorbing modules connected and suspended in the interior of a tube.

FIG. 2 shows an exemplary embodiment of the apparatus comprising at least one impact-absorbing module (1) suspended in the interior of the tube, where each impact-absorbing module (1) is made up of the following elements:

A helical impact-absorber having double helix shape (2) with a cylindrical nucleus (21), with a groove 34 along its longitudinal axis and at least two helical blades (22) opposing each other and at right angles to the cylindrical nucleus (21), and extending over the length of the body of the nucleus (21), to each complete a half-cycle of each helix, and placed radially so as to occupy the whole of the internal diameter of the vertical tube.

A central axis (3) made up of a rod (33), a first connector (31) and a second connector (32) which are fixed to each end of the rod (33), so as to maintain the positioning of the rod (33) and to link with the other elements, the rod (33) being positioned, to have some play or movement in the longitudinal access of the cylindrical nucleus (21).

A suspension wire (4), with one end connected to the first connector (31) of the central axis (3) to position the impact-absorbing module (1) suspended in the interior of the vertical tube, the suspension wire (4) being able to connect a number of sequential impact-absorbing modules (1) together so as to occupy a specific height of the vertical tube.

The number of impact-absorbing modules (1) may vary in accordance with the volume of particulate material to be loaded and with the height of the vertical tube. The greater the height of the tube and the volume of the particulate material to be loaded, the quantity of impact-absorbing modules (1) may be proportionally greater.

Figure 3A:
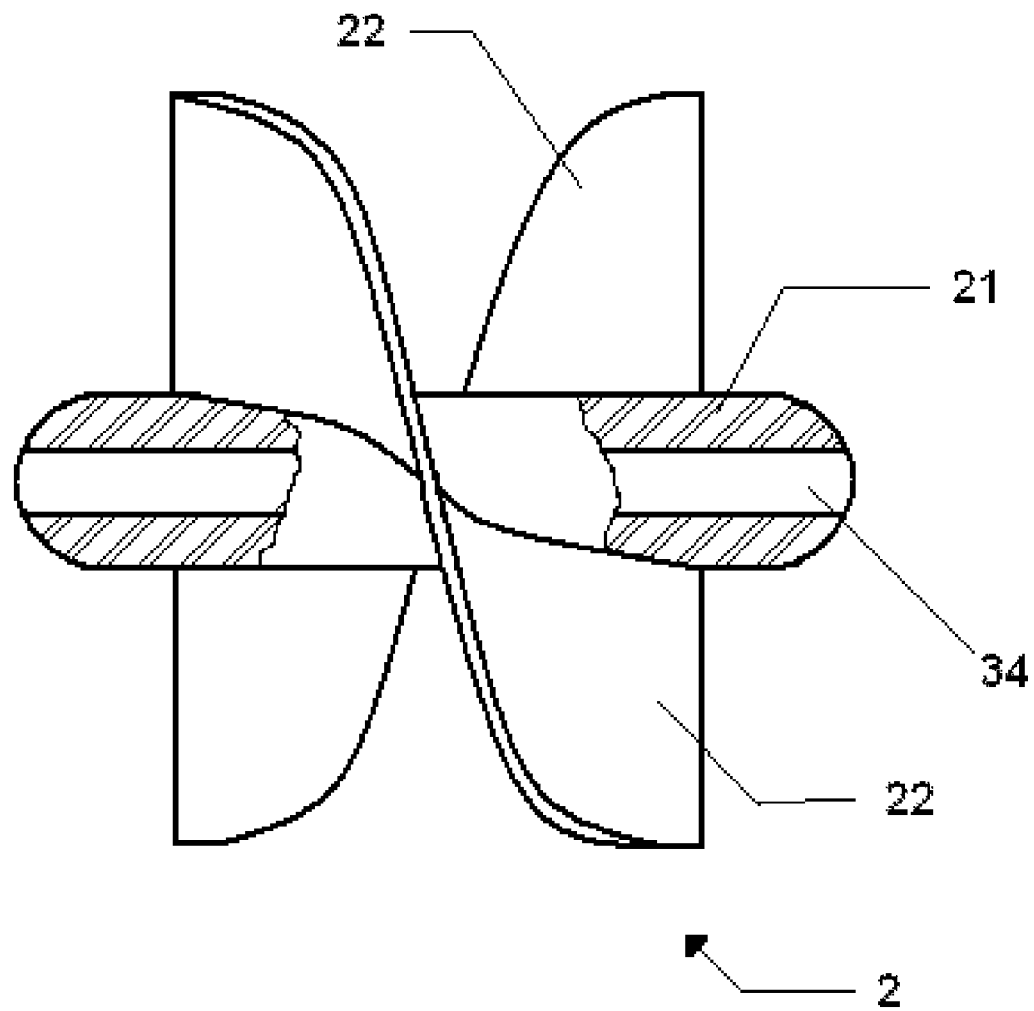
FIG. 3A shows a side view with a partial section of an exemplary embodiment of the helical impact-absorber of the double helix.
Figure 4:
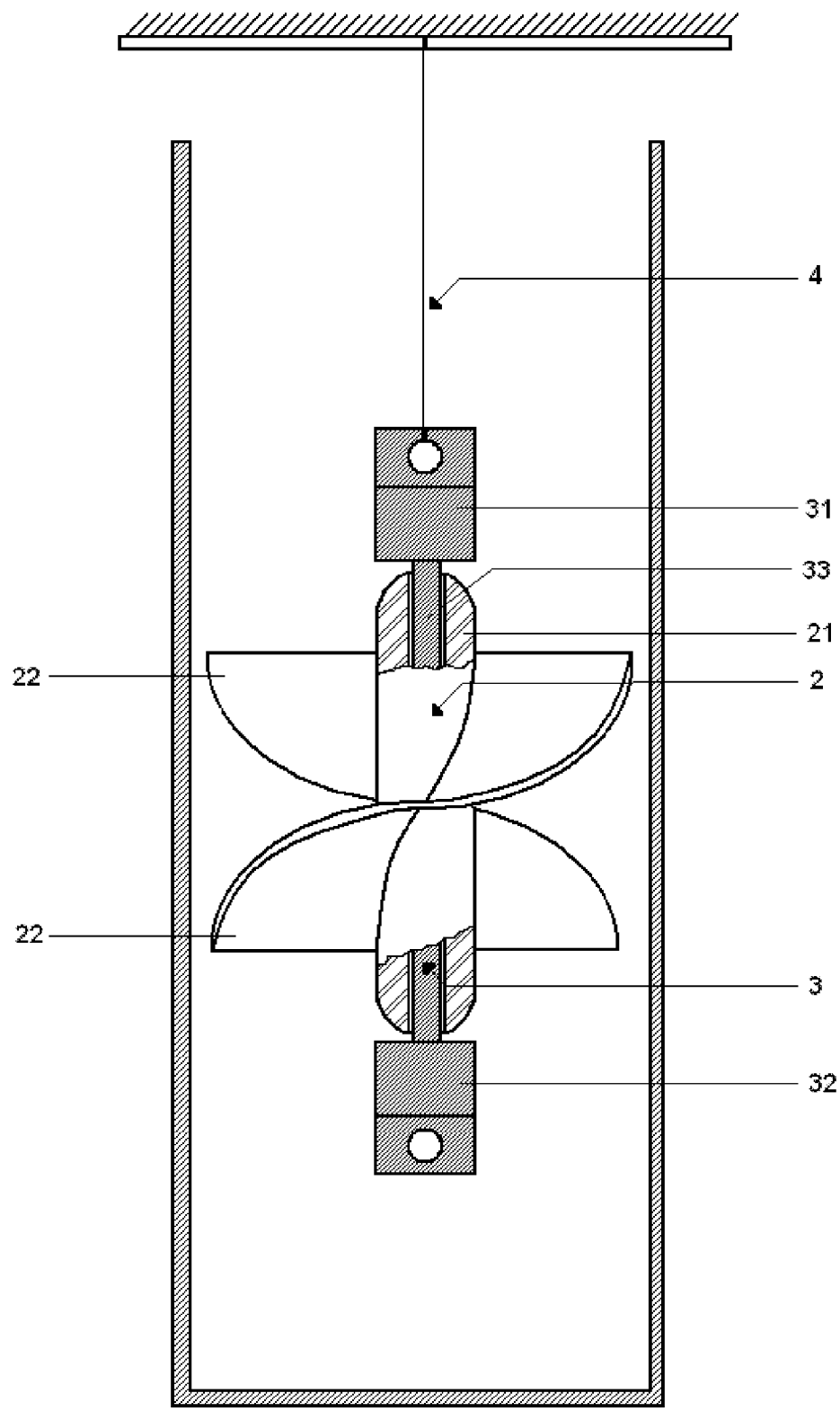
FIG. 4 shows an exemplary embodiment with only one impact-absorbing module suspended in the interior of the tube.
Figure 5:
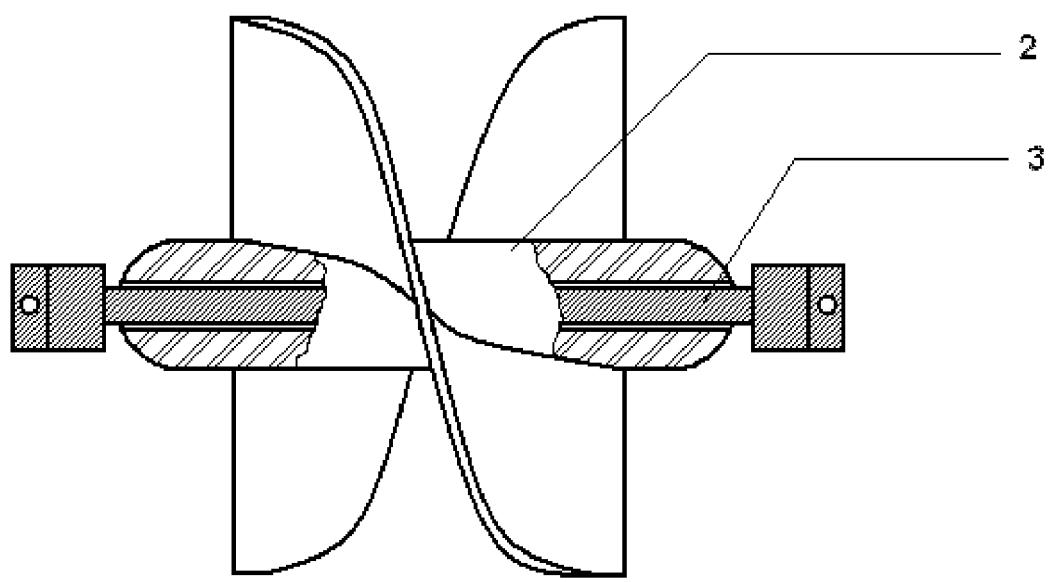
FIG. 5 shows a side view of an exemplary embodiment of the helical impact-absorber of the double helix with the central axis inserted in its cylindrical nucleus.
Figure 6A:
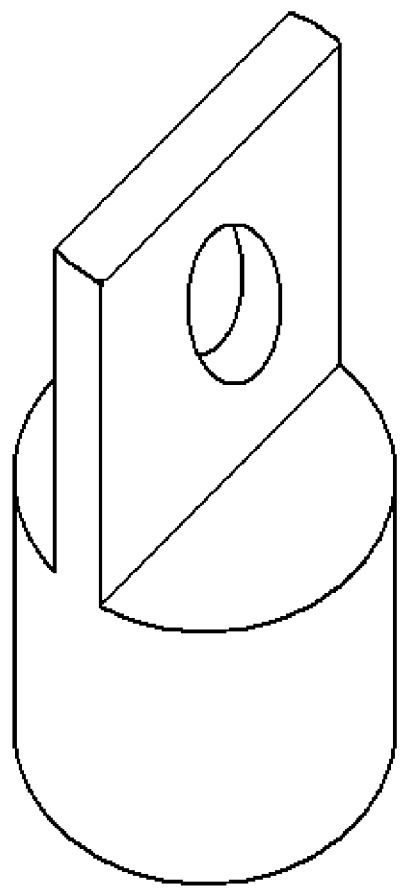
FIG. 6A gives a perspective view of an exemplary embodiment of one of the connectors of the central axis.
Figure 6B:
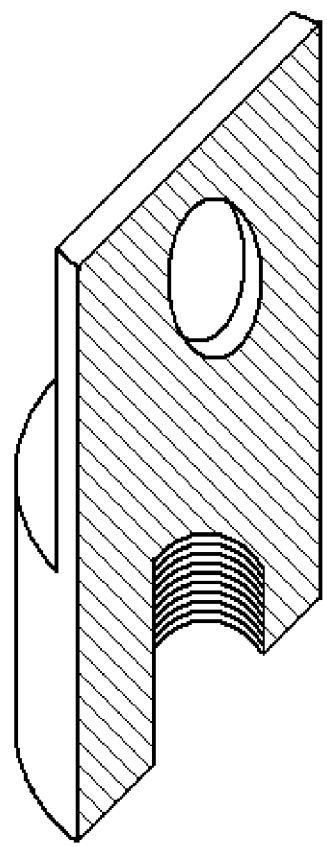
FIG. 6B gives a perspective view with a section of an exemplary embodiment of one of the connectors of the central axis.

FIG. 3A presents a side view with a partial section of an exemplary embodiment of the helical impact-absorber of the double helix (2), which may be made of material with a low coefficient of friction, such as Teflon, for example. This material avoids retention of the particulate material that comes into contact with the helical impact-absorber (2) during the loading.

FIG. 3B presents exemplary embodiments of the elements which make up the central axis (3) which may be made from a metallic material, which could, for example, be stainless steel.

The play between the rod (33) of the central axis (3) and the helical impact-absorber of the double helix (2) allows the helical impact-absorber (2) to turn freely about its longitudinal axis. This property allows the particulate material to be uniformly distributed in the interior of the vertical tube.

The first connector (31) and the second connector (32) act as limiters in the longitudinal travel of the helical impact-absorber (2), which allows the helical impact-absorber to remain linked to the central axis (3) with some play (thus keeping the apparatus as a single unit during loading).

The suspension wire (4) may be of such a size as to maintain a distance between one helical impact-absorber (2) and another element linked to it, in the interior of the tube. The scaling of may ensure that there is no breakage of the particulate material when there is impact with the element immediately below.

The suspension wire (4) may be made of a metallic material which could be, for example, stainless steel.

The configuration of the helical impact-absorber (2) in a double helix may allow its reduced dimensions, which facilitates the handling and operation of the apparatus, as well as making unlikely that particulate material will be retained when it passes through the helical impact-absorber (2).

If the particulate material is retained on the helical impact-absorber (2), a manual movement on the sustaining wire (3) would be enough to eliminate the retention.

An exemplary embodiment of the method of loading and distribution of particulate material in the interior of a vertical tube using the apparatus described above comprises the following steps:
- positioning the apparatus in the interior of the vertical tube to be filled with particulate material;
- loading a volume of particulate material in the interior of the vertical tube in such a way that the particulate material contacts at least one helical impact absorber (2) and is deposited, in distributed form, in the interior of the tube;
- lifting each impact-absorbing module (1) for a height equivalent to the length of the module (1) when the corresponding volume of particulate material is loaded and distributed into the tube;
- removing successively each impact-absorbing module (1) of the apparatus with each loading of a corresponding volume of particulate material;
- removing the whole of the apparatus when all of the volume of particulate material is completely loaded.

When the particulate material contacts the helical impact-absorbers (2), the particulate material receives a horizontal velocity component, which reduces its component of vertical velocity before passing to the next impact-absorbing module (1) or coming to rest in the interior of the column. This reduction in vertical velocity characterizes the impact absorption generated by the apparatus, which prevents breakage of the particulate material as a result of the force of gravity.

The helical path followed by the particulate material acts in favor of its distribution in the interior of the column, which makes it possible to obtain a loading with uniform density and without the need for blows of a hammer or any other method that might damage the structure of the tube.

The volume of particulate material in each loading corresponds to the height that one impact-absorbing module (1) occupies inside the tube. Thus, when the last of the impact-absorbing modules (1) that constitute the apparatus is removed, the vertical tube will have been completely filled with the particulate material.

For in the exemplary case of this invention, the particulate material loaded is Catalyst of Conversion Furnaces of Hydrogen Generation Units. However, alternative materials may also be used.

The above description of exemplary embodiments of the apparatus and method for loading of particulate material in vertical columns, of this invention, should be considered only as one possible form of the apparatus, and any particular characteristics should be understood as merely facilitating understanding. Hence, the invention is not limited to the specific features shown in the exemplary embodiments, but is only limited by the recitations of the claims below.

The invention claimed is:

1. An apparatus for loading particulate material into the interior of a vertical tube comprising at least one impact-absorbing module, said impact absorbing module comprising:
- a helical impact-absorber having a double helix shape, a cylindrical nucleus having a groove along its longitudinal axis, and at least two helical blades having a propeller shape, the two helical blades disposed opposite to each other and forming right angles to the cylindrical nucleus to extend along the body of the nucleus to complete a half-cycle of each helix;
- a central axis comprising a rod, a first connector fixed to an end of the rod so as to maintain the positioning of the rod, the rod being positioned in the groove of the cylindrical nucleus so as to have play along the longitudinal axis of the cylindrical nucleus; and
- a suspension wire having one end linked to the first connector of the central axis to positions the impact-absorbing module suspended in the interior of the vertical tube.

2. An apparatus in accordance with claim 1, wherein the two-blade helical impact-absorber is made from a material with a low coefficient of friction.

3. An apparatus in accordance with claim 2, wherein the material with low coefficient of friction is polytetrafluoroethylene.

4. An apparatus in accordance with claim 1, wherein the central axis is made from a metallic material.

5. An apparatus in accordance with claim 4, wherein the metallic material is stainless steel.

6. An apparatus, in accordance with claim 1, wherein the play between the rod of the central axis and the two-blade helical impact-absorber allows the impact-absorber to turn freely about its longitudinal axis.

7. An apparatus in accordance with claim 1, wherein the first connector, and the second connector limit the longitudinal travel of the impact-absorber.

8. An apparatus in accordance with claim 1, wherein the suspension wire is made of a metallic material.

9. An apparatus in accordance with claim 8, wherein the metallic material is stainless steel.

10. A method of loading and distributing particulate material in the interior of a vertical tube by means of the apparatus defined in claim 1, said method comprising:
- positioning the apparatus in the interior of the vertical tube to be filled with particulate material;
- loading a volume of particulate material in the interior of the vertical tube so that the particulate material contacts at least one helical impact-absorber (2) and is deposited in the interior of the tube;
- lifting each impact-absorbing module through a height equivalent to the length of the module when the corresponding volume of particulate material is loaded and distributed in the tube;
- removing, successively, each impact-absorbing module of the apparatus with each loading of a corresponding volume of particulate material;
- removing the entire apparatus when all the volume of particulate material has been completely loaded.

11. A method in accordance with claim 10, wherein the volume of particulate material in each loading corresponds to the height that one impact-absorbing module occupies within the tube.

12. A method in accordance with claim 10, wherein the particulate material is catalyst.

13. A method in accordance with claim 12, wherein the catalyst is for Conversion Furnaces of Hydrogen Generation Units.

14. The apparatus according to claim 1, wherein the impact absorbing module comprises a second helical impact-absorber having the double helix shape, and the rod having a second connector fixed to an opposite end of the rod from the first connector, the second connector connected to a second rod so as to maintain the positioning of the second rod, the second rod being positioned in a groove of a cylindrical axis of the second helical impact-absorber so as to have play along the longitudinal axis of a cylindrical nucleus of the second helical impact-absorber.

15. A system for loading particulate material into the interior of a vertical tube comprising at least one impact-absorbing module, the system comprising:
the vertical tube;
said impact absorbing module comprising:
a helical impact-absorber having a double helix shape, a cylindrical nucleus having a groove along its longitudinal axis, and at least two helical blades having a propeller shape, the two helical blades disposed opposite to each other and forming right angles to the cylindrical nucleus to extend along the body of the cylindrical nucleus to complete a half-cycle of each helix, and wherein the at least two blades have a radial dimension so as to occupy an internal diameter of the vertical tube;
a central axis comprising a rod, a first connector fixed to an end of the rod so as to maintain the positioning of the rod, the rod being positioned in the groove of the cylindrical nucleus so as to have play along the longitudinal axis of the cylindrical nucleus; and
a suspension wire having one end linked to the first connector of the central axis to positions the impact-absorbing module suspended in the interior of the vertical tube.

16. The system according to claim 15, wherein the impact absorbing module comprises a second helical impact-absorber having the double helix shape, and the rod having a second connector fixed to an opposite end of the rod from the first connector, the second connector connected to a second rod so as to maintain the positioning of the second rod, the second rod being positioned in a groove of a cylindrical axis of the second helical impact-absorber so as to have play along the longitudinal axis of a cylindrical nucleus of the second helical impact-absorber.

* * * * *